United States Patent
Duranleau-Hendrickx et al.

(10) Patent No.: US 12,077,278 B1
(45) Date of Patent: Sep. 3, 2024

(54) SYSTEMS AND METHODS FOR DETECTING ERRONEOUS PROPELLER BLADE PITCH MEASUREMENTS

(71) Applicant: Pratt & Whitney Canada Corp., Longueuil (CA)

(72) Inventors: Louis Duranleau-Hendrickx, Montreal (CA); Bryan Chen, Montreal (CA); Kenneth Matheson, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 3 days.

(21) Appl. No.: 18/140,347

(22) Filed: Apr. 27, 2023

(51) Int. Cl.
B64C 11/30 (2006.01)

(52) U.S. Cl.
CPC ................... B64C 11/301 (2013.01)

(58) Field of Classification Search
CPC ..... F03D 7/0224; F03D 17/00; B64C 11/301; F05B 2270/328; F05B 2270/802
See application file for complete search history.

(56) References Cited

U.S. PATENT DOCUMENTS

| | | | | |
|---|---|---|---|---|
| 5,997,250 A * | 12/1999 | Carter, Jr. | ............... | B64C 11/40 |
| | | | | 416/37 |
| 8,262,352 B2 | 9/2012 | Gainford | | |
| 10,487,682 B2 * | 11/2019 | Duke | ................ | B64C 11/30 |
| 2016/0059960 A1 * | 3/2016 | Fearn | ................ | B64C 27/06 |
| | | | | 244/17.11 |
| 2017/0210461 A1 * | 7/2017 | Siu | .................. | B64C 27/10 |
| 2018/0050816 A1 | 2/2018 | Yakobov | | |
| 2022/0243608 A1 | 8/2022 | Krzywon | | |
| 2022/0243610 A1 | 8/2022 | Krzywon | | |
| 2023/0174220 A1 * | 6/2023 | Albrecht | ............... | B64C 11/385 |
| | | | | 416/156 |

* cited by examiner

Primary Examiner — Courtney D Heinle
Assistant Examiner — Andrew Thanh Bui
(74) Attorney, Agent, or Firm — Getz Balich LLC (57) ABSTRACT

An assembly for an aircraft propulsion system includes a propeller, a blade position sensor, and a controller. The propeller is configured for rotation about a rotational axis. The propeller includes a plurality of propeller blades. The plurality of propeller blades have a pitch. Each propeller blade of the plurality of propeller blades is configured for rotation about a respective lengthwise axis to selectively vary the pitch. The blade position sensor is configured to measure the pitch. The blade position sensor is configured to generate a pitch output signal representative of the measured pitch. The controller is in signal communication with the blade position sensor. The controller includes a processor in communication with a non-transitory memory storing instructions, which instructions when executed by the processor, cause the processor to: detect a presence or an absence of an erroneous propeller blade pitch measurement using at least the pitch output signal.

19 Claims, 6 Drawing Sheets

SYSTEMS AND METHODS FOR DETECTING ERRONEOUS PROPELLER BLADE PITCH MEASUREMENTS

TECHNICAL FIELD

This disclosure relates generally to aircraft propulsion systems including variable-pitch propellers and, more particularly, to systems and methods for detecting erroneous propeller blade pitch measurements.

BACKGROUND OF THE ART

Some propulsion systems for aircraft may include propellers having variable-pitch propeller blades. Various systems and methods are known in the art for measuring propeller blade pitch. While these known propeller blade pitch measuring systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system includes a propeller, a blade position sensor, and a controller. The propeller is configured for rotation about a rotational axis. The propeller includes a plurality of propeller blades circumferentially distributed about the propeller. The plurality of propeller blades have a pitch. Each propeller blade of the plurality of propeller blades is configured for rotation about a respective lengthwise axis to selectively vary the pitch. The blade position sensor is configured to measure the pitch. The blade position sensor is configured to generate a pitch output signal representative of the measured pitch. The controller is in signal communication with the blade position sensor. The controller includes a processor in communication with a non-transitory memory storing instructions, which instructions when executed by the processor, cause the processor to: detect a presence or an absence of an erroneous propeller blade pitch measurement using at least the pitch output signal.

In any of the aspects or embodiments described above and herein, the instructions, when executed by the processor, may further cause the processor to identify the presence or the absence of the erroneous propeller blade pitch measurement using the pitch output signal and a propulsion system power parameter.

In any of the aspects or embodiments described above and herein, the assembly may further include a rotatable shaft and a torque sensor. The rotatable shaft may be connected to the propeller. The rotatable shaft may be configured to drive the propeller for rotation about the rotational axis. The torque sensor may be disposed at the rotatable shaft. The torque sensor may be configured to measure a torque of the shaft and generate a torque output signal representative of the measured torque. The torque output signal may be the propulsion system power parameter.

In any of the aspects or embodiments described above and herein, the instructions, when executed by the processor, may further cause the processor to identify the presence or the absence of the erroneous propeller blade pitch measurement by comparing the pitch output signal and the propulsion system power parameter to a detection zone.

In any of the aspects or embodiments described above and herein, the instructions, when executed by the processor, may further cause the processor to identify the presence of the erroneous propeller blade pitch measurement based on identification of the pitch output signal and the propulsion system power parameter within the detection zone.

In any of the aspects or embodiments described above and herein, the instructions, when executed by the processor, may further cause the processor to determine the detection zone based on one or more aircraft operating conditions.

In any of the aspects or embodiments described above and herein, the one or more aircraft operating conditions may include at least one of airspeed, air temperature, humidity, and altitude.

In any of the aspects or embodiments described above and herein, the instructions, when executed by the processor, may further cause the processor to identify the presence of the erroneous propeller blade pitch measurement subsequent to execution of a latch timing process by the processor.

In any of the aspects or embodiments described above and herein, the instructions, when executed by the processor, may further cause the processor to identify the presence of the erroneous propeller blade pitch measurement subsequent to execution of a steady state verification process by the processor.

In any of the aspects or embodiments described above and herein, the instructions, when executed by the processor, may further cause the processor to generate a warning in response to detecting the presence of the erroneous propeller blade pitch measurement.

In any of the aspects or embodiments described above and herein, the instructions, when executed by the processor, may further cause the processor to generate a substitute value of the pitch in response to detecting the presence of the erroneous propeller blade pitch measurement.

According to another aspect of the present disclosure, a method for detecting an erroneous propeller blade pitch measurement for an aircraft propulsion system is provided. The method includes determining a propulsion system power parameter, measuring a propeller blade pitch for a plurality of propeller blades of a propeller for the aircraft propulsion system, comparing the propulsion system power parameter and the propeller blade pitch to a detection zone, and detecting an erroneous propeller blade pitch measurement based on identification of the propulsion system power parameter and the propeller blade pitch within the detection zone.

In any of the aspects or embodiments described above and herein, the detection zone may be defined by predetermined ranges of the propulsion system power parameter and the propeller blade pitch.

In any of the aspects or embodiments described above and herein, the method may further include selecting the detection zone based on one or more aircraft operating conditions.

In any of the aspects or embodiments described above and herein, the method may further include determining the detection zone based on one or more aircraft operating conditions.

In any of the aspects or embodiments described above and herein, the method may further include identifying the propulsion system power parameter and the propeller blade pitch within the detection zone and executing one or both of a latch timing process and a steady state verification process prior to detecting the erroneous propeller blade pitch measurement based on identification of the propulsion system power parameter and the propeller blade pitch within the detection zone.

According to another aspect of the present disclosure, an aircraft propulsion system includes a rotatable shaft, a propeller, a torque sensor, a blade position sensor, and a controller. The rotatable shaft is configured for rotation about a rotational axis. The propeller is connected to the rotatable shaft. The propeller is configured to be driven by the rotatable shaft for rotation about the rotational axis. The propeller includes a plurality of propeller blades having a pitch. The torque sensor is configured to measure a torque of the rotatable shaft. The blade position sensor is configured to measure the pitch. The controller is in signal communication with the torque sensor and the blade position sensor. The controller includes a processor in communication with a non-transitory memory storing instructions, which instructions when executed by the processor, cause the processor to: detect a presence or an absence of an erroneous propeller blade pitch measurement using the torque and the pitch.

In any of the aspects or embodiments described above and herein, the instructions, when executed by the processor, may further cause the processor to identify the presence or the absence of the erroneous propeller blade pitch measurement by comparing the pitch and the torque to a detection zone.

In any of the aspects or embodiments described above and herein, the instructions, when executed by the processor, may further cause the processor to identify the presence of the erroneous propeller blade pitch measurement based on identification of the pitch and the torque within the detection zone.

In any of the aspects or embodiments described above and herein, the instructions, when executed by the processor, may further cause the processor to determine the detection zone based on one or more aircraft operating conditions.

The present disclosure, and all its aspects, embodiments and advantages associated therewith will become more readily apparent in view of the detailed description provided below, including the accompanying drawings.

DETAILED DESCRIPTION

Figure 1:
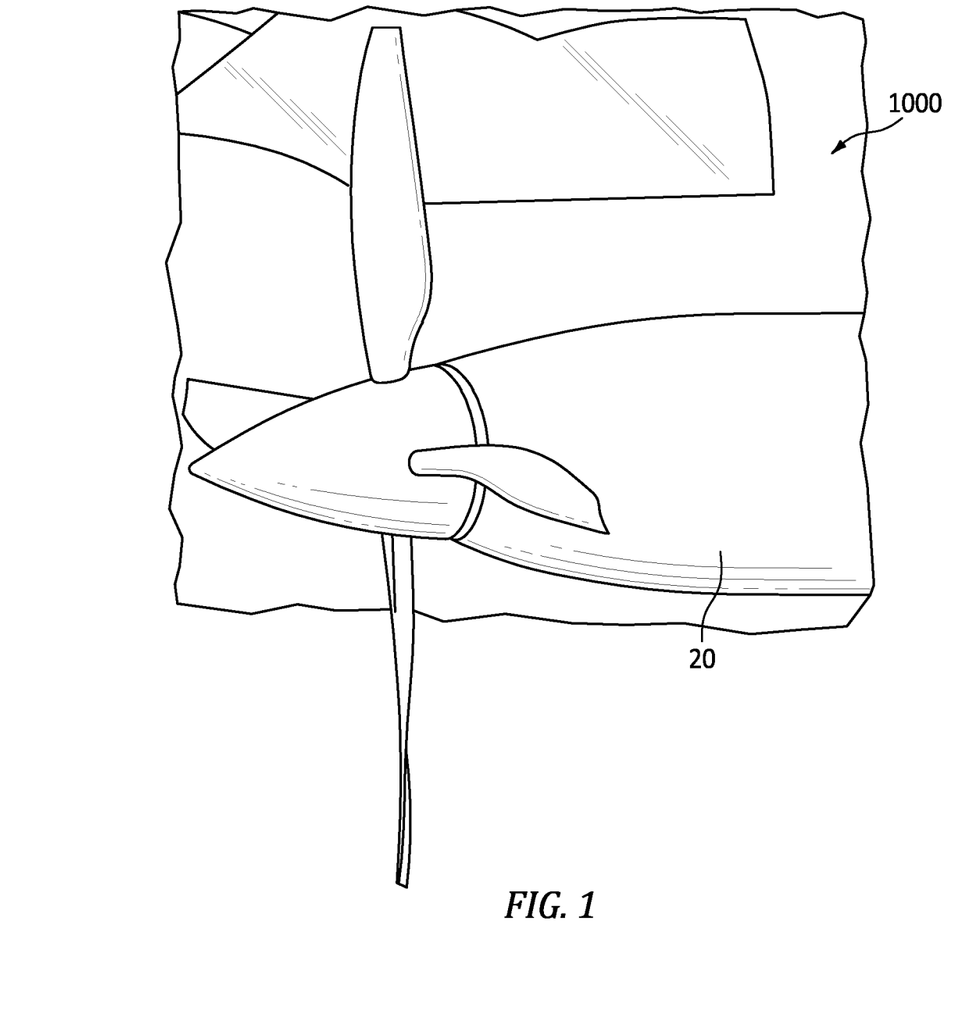
FIG. 1 illustrates a perspective view of a portion of an aircraft including a propulsion system, in accordance with one or more embodiments of the present disclosure.
Figure 2:
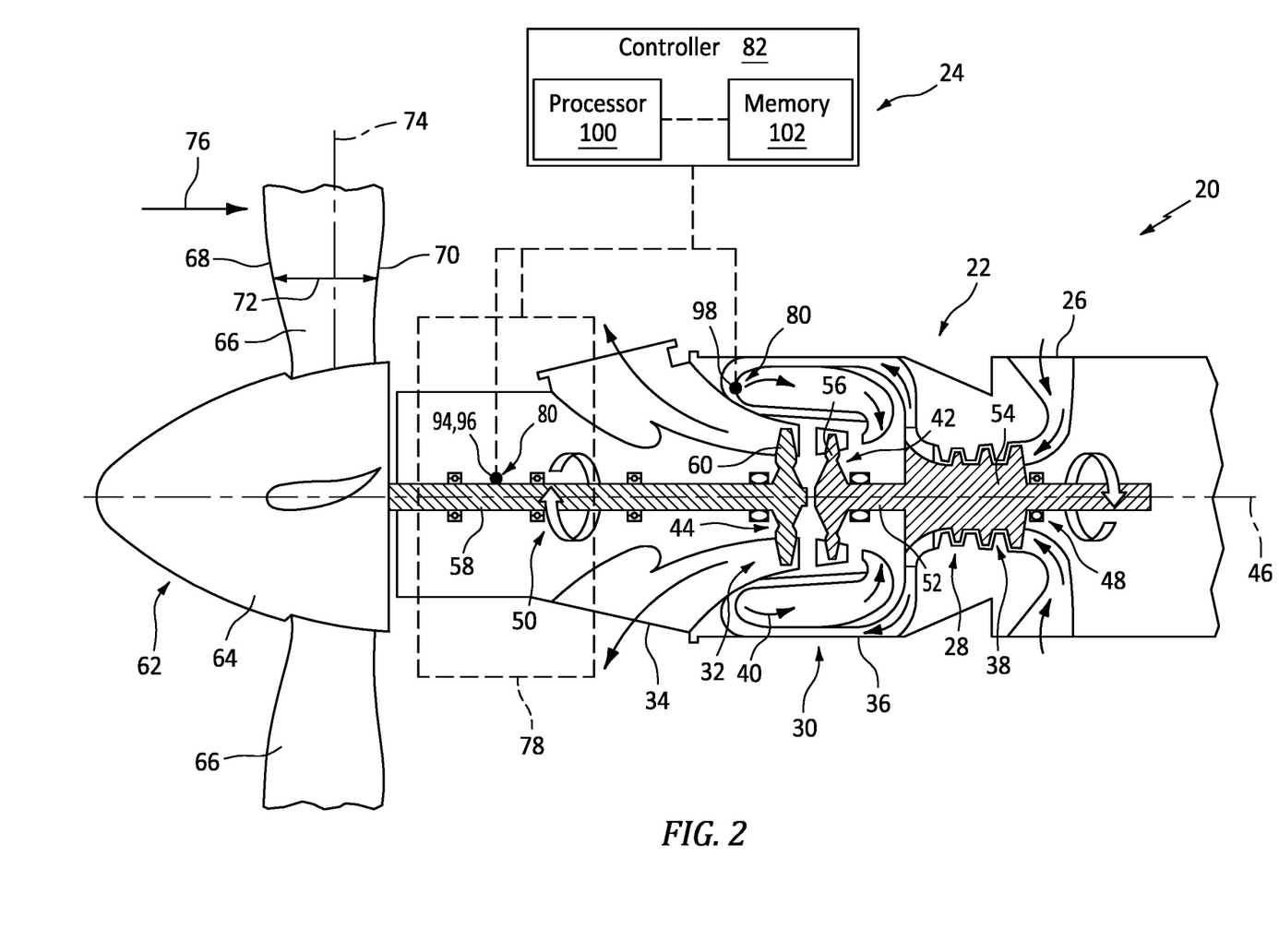
FIG. 2 illustrates a schematic, cutaway view of a propulsion system for an aircraft, in accordance with one or more embodiments of the present disclosure.

FIG. 1 illustrates an aircraft 1000 including a propulsion system 20. FIG. 2 is a schematic illustration of a configuration of the aircraft propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The propulsion system 20 of FIG. 2 includes a gas turbine engine 22 and a propeller blade control assembly 24. However, while propulsion system 20 of FIG. 2 includes a gas turbine engine (e.g., the gas turbine engine 22), the present disclosure is also applicable to propulsion systems which do not include gas turbine engines such as, but not limited to, a battery-electric propulsion system (e.g., an electric-motor driven propeller system).

The gas turbine engine 22 of FIG. 2 is configured as a turboprop engine. The gas turbine engine 22 of FIG. 2 includes an air inlet 26, a compressor section 28, a combustor section 30, a turbine section 32, an exhaust 34, and an engine static structure 36. The compressor section 30 includes a compressor 38. The combustor section 30 includes an annular combustor 40. The turbine section 32 includes a high-pressure turbine (HPT) 42 and a power turbine 44. The gas turbine engine 22 sections 28, 30, 32 of FIG. 2 are arranged along an axial centerline 46 (e.g., a rotational axis) of the gas turbine engine 22. The engine static structure 36 may include, for example, one or more engine cases for the gas turbine engine 22. The engine static structure 36 may additionally include cowlings, bearing assemblies, or other structural components of the gas turbine engine 22. The one or more engine cases house and/or structurally support one or more of the engine sections 28, 30, 32.

The gas turbine engine 22 of FIG. 2 further includes a first rotational assembly 48 (e.g., a high-pressure spool) and a second rotational assembly 50 (e.g., a power spool). The first rotational assembly 48 and the second rotational assembly 50 are mounted for rotation about the axial centerline 46 relative to the engine static structure 36. The first rotational assembly 48 and the second rotational assembly 50 of FIG. 2 form a "free turbine" configuration for the gas turbine engine 22 in which the second rotational assembly 50 is disposed entirely downstream of the first rotational assembly 48 with respect to gas flow through the engine sections 28, 30, 32 (e.g., the first rotational assembly 48 is axially displaced from the second rotational assembly 50). The present disclosure, however, is not limited to the particular gas turbine engine 22 configuration of FIG. 2. For example, the present disclosure is also applicable to gas turbine engines having single-spool, three-spool, and/or concentric spool configurations. Moreover, the present disclosure is not limited to rotational assemblies (e.g., the first rotational assembly 48 and the second rotational assembly 50) configured for rotation about a same rotational axis (e.g., the axial centerline 46).

The first rotational assembly 48 includes a first shaft 52, a bladed first compressor rotor 54 for the compressor 38, and a bladed first turbine rotor 56 for the high-pressure turbine 42. The first shaft 52 interconnects the bladed first compressor rotor 54 and the bladed first turbine rotor 56.

The second rotational assembly 50 includes a second shaft 58, a bladed second turbine rotor 60 for the power turbine 44, and a propeller 62. The second shaft 58 may directly or indirectly interconnect the bladed second turbine rotor 60 and the propeller 62. The second shaft 58 of FIG. 2 extends between and to the bladed second turbine rotor 60 and the propeller 62. Alternatively, the second shaft 58 may be connected to the propeller 62 by one or more gear assemblies (not shown) configured to drive the propeller 62 at a reduced rotational speed relative to the second shaft 58.

The propeller 62 of FIG. 2 is configured for rotation about a rotational axis (e.g., the axial centerline 46). The propeller 62 of FIG. 2 includes a hub 64 and a plurality of propeller blades 66. The propeller blades 66 are mounted to the hub 64. The propeller blades 66 are circumferentially distributed about the hub 64, for example, relative to the axial centerline 46. Each propeller blade 66 includes a leading edge 68 and a trailing edge 70. Each propeller blade 66 may be understood to have a chord 72 representing an imaginary line extending between and to the leading edge 68 and the trailing edge 70. For clarity, the chord 72 of FIG. 2 is illustrated as extending in a substantially axial direction relative to the axial centerline 46, however, the present disclosure is not limited to the chord 72 orientation illustrated in FIG. 2. The propeller blades 66 are configured as variable-pitch propeller blades 66. For example, the propeller blades 66 may each be rotatable about a lengthwise axis 74 to control (e.g., selectively vary) a pitch (e.g., an angle; sometimes referred to as a "beta angle") of the propeller blades 66 (e.g., the chord 72), as will be discussed below in further detail. Accordingly, the propeller 62 may be referred to as a variable-pitch propeller. The variable-pitch propeller 62 of the present disclosure should be understood to include variable-pitch propellers in which a pilot (or control system) may select from multiple propeller blade pitch positions as well as variable-pitch propellers in which a pitch of the propeller blades is selected to maintain a constant or substantially constant propeller rotation speed (sometimes referred to as a "constant-speed" propeller).

During operation of the propulsion system 20 of FIG. 2, ambient air enters the gas turbine engine 22 through the air inlet 26 and is directed through the engine sections 28, 30, 32 along a core flow path. The air within the core flow path may be referred to as "core air." The core air is compressed by the bladed first compressor rotor 54 and directed into a combustion chamber of the combustor 40. Fuel is injected into the combustion chamber and mixed with the compressed core air to provide a fuel-air mixture. This fuel-air mixture is ignited and combustion products thereof, which may be referred to as "core combustion gas," flow through and sequentially cause the bladed first turbine rotor 56 and the bladed second turbine rotor 60 to rotate. The rotation of the bladed first turbine rotor 56 and the bladed second turbine rotor 60 respectively drive rotation of the first rotational assembly 48 and the second rotational assembly 50. Rotation of the second rotational assembly 50 further drives rotation of the propeller 62 to provide propulsion (e.g., thrust for an aircraft on which the propulsion system 20 is installed).

The propeller blade control assembly 24 is configured to control the pitch of each of the propeller blades 66. The propeller blade control assembly 24 of FIG. 2 includes an oil system 78 and one or more sensors 80. The propeller blade control assembly 24 may additionally include a controller 82.

Figure 3:
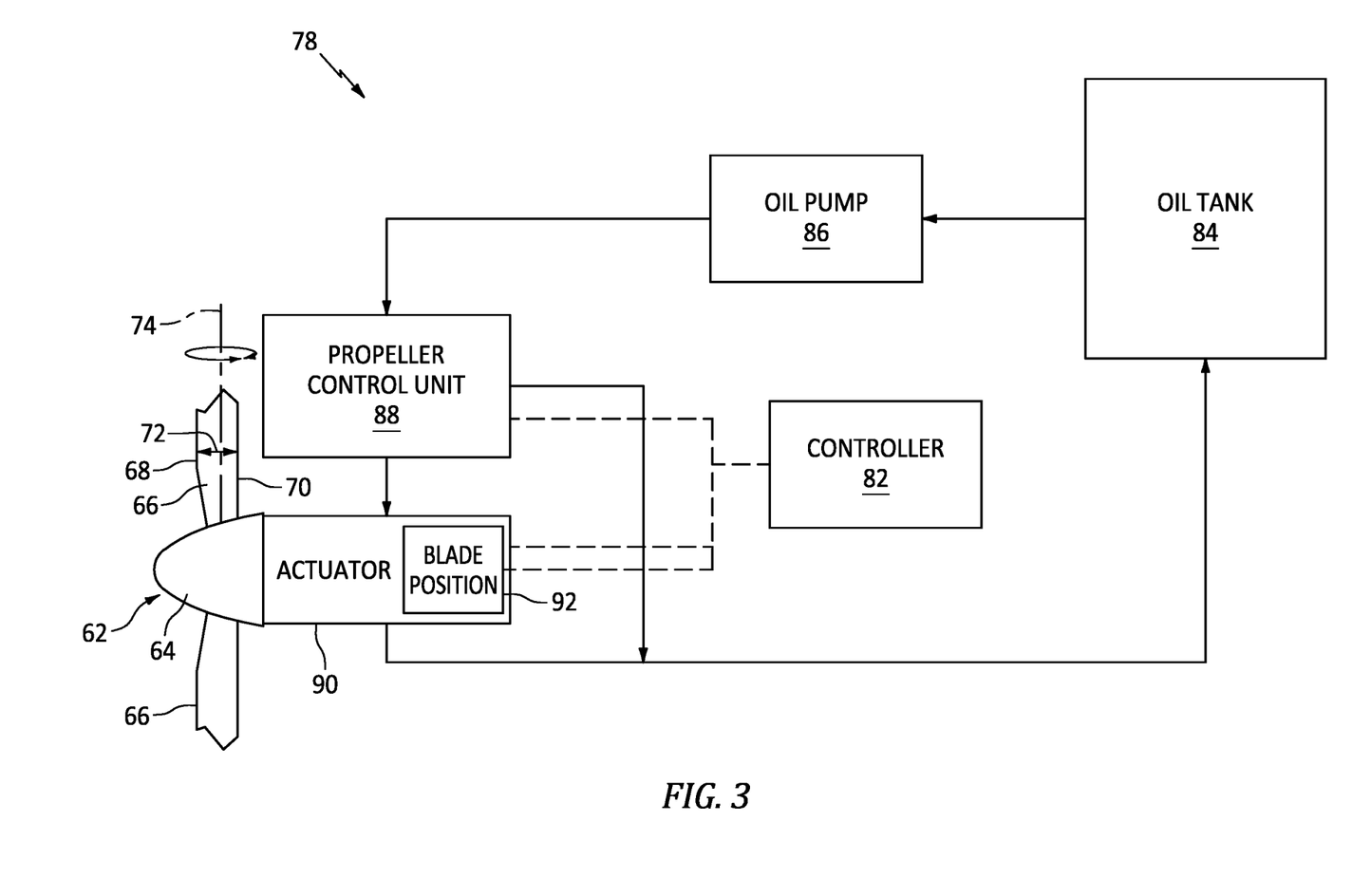
FIG. 3 illustrates a block diagram of a propeller blade control system, in accordance with one or more embodiments of the present disclosure.

FIG. 3 illustrates a block diagram of an exemplary configuration of the oil system 78. The oil system 78 is configured to supply and direct oil for the control of the pitch of each of the propeller blades 66. The oil system 78 may additionally be configured to provide lubrication for rotational components of the gas turbine engine 22 (e.g., the first rotational assembly 48 and/or the second rotational assembly 50) such as, but not limited to, bearings, shafts, gears and/or gear assemblies, and the like. The oil system 78 of FIG. 3 includes an oil tank 84, an oil pump 86, a propeller control unit (PCU) 88, and an actuator 90. The oil system 78 may include fluid lines (e.g., conduits, pipes, hoses, etc.), connectors, valves, pumps, filters, heat exchangers, and/or other components to direct oil to and from components of the oil system 78. The present disclosure, however, is not limited to the particular configuration of the oil system 78 illustrated in FIG. 3.

The oil tank 84 is configured to store and serve as a source of oil for the oil system 78. The oil system 78 may include a plurality of oil tanks of which the oil tank 84 may be configured as a main oil tank or an auxiliary oil tank. The oil pump 86 is connected in fluid communication between the oil tank 84 and the propeller control unit 88. The oil pump 86 is configured to direct oil from the oil tank 84 to the propeller control unit 88. The oil pump 86 may additionally be configured to direct oil from the oil tank 84 to other oil loads (e.g., bearings, shafts, gears and/or gear assemblies, etc.) of the oil system 78.

The propeller control unit 88 of FIG. 3 is configured to direct and control a flow of oil from the oil pump 86 to the actuator 90, and thereby control the pitch of the propeller blades 66 via the actuator 90. For example, the propeller control unit 88 of FIG. 3 modulates the oil (e.g., oil flow, oil pressure, etc.) provided by the oil pump 86 to the actuator 90 to control (e.g., hydraulically control) the pitch of the propeller blades 66. The propeller control unit 88 is configured to vary a pitch of each propeller blade 66 by effecting and controlling rotation of each propeller blade 66 about the lengthwise axis 74 of each respective propeller blade 66. The pitch of each propeller blade 66 may be understood, for example, as an angle between the chord 72 and a rotational plane of the propeller 62 (e.g., a plane which is perpendicular to a rotational axis of the propeller 62). The propeller control unit 88 of FIG. 3 is additionally configured to divert excess oil from the propeller control unit 88 along a leakage flow path to return the excess oil to the oil tank 84. The actuator 90 may be configured as a hydraulic actuator. The actuator 90 may control rotation of each of the propeller blades 66 using the oil (e.g., oil pressure) supplied and controlled by the propeller control unit 88. The present disclosure is not limited to any particular configuration of the actuator 90.

The actuator 90 of FIG. 3 includes a blade position sensor 92. The blade position sensor 92 is configured to measure the pitch (e.g., a rotational position) of the propeller blades 66 and generate an output signal representative of the measured pitch. For example, the blade position sensor 92 may be configured to convert the rotational motion of the propeller blades 66 (e.g., about their respective lengthwise axes 74) to a linear (e.g., axial) motion through a mechanical configuration such as, but not limited to, a scotch and yoke mechanism. The linear position, which is representative of the pitch of the propeller blades 66, may be measured (e.g., using a linear variable differential transformer (LVDT)) or another suitable position measuring configuration, to generate the output signal representative of the measured pitch. Additional details regarding propeller blade actuators and positions sensors may be found at least in U.S. Patent Publication No. 2018/0050816, the disclosure of which is hereby incorporated herein by reference in its entirety. The present disclosure, however, is not limited to any particular blade position sensor configuration, and aspects of the present disclosure are relevant to any configuration of blade position sensor configured to measure a propeller blade pitch and generate an output signal representative of the measured propeller blade pitch.

The one or more sensors 80 are configured to measure one or more propulsion system operating parameters of the propulsion system 20 and/or its gas turbine engine 22. For example, the one or more sensors 80 may be configured to measure one or more propulsion system operating parameters which may be representative of a power output of the propulsion system 20 and/or its gas turbine engine 22, or may otherwise be used in determining a power output of the propulsion system 20 and/or its gas turbine engine 22 (e.g., a propulsion system power parameter). For example, the one or more sensors 80 of FIG. 2 may include a torque sensor 94, a rotation speed sensor 96, and/or a fuel flow rate sensor 98. The torque sensor 94 of FIG. 2 is configured to measure a torque exhibited by the second shaft 58. Similarly, the shaft speed sensor 96 of FIG. 2 is configured to measure a rotation speed of the second shaft 58 and/or the propeller 62. The present disclosure, however, is not limited to measurement of torque and/or rotation speed parameters for the second shaft 58. For example, the torque sensor 94 and/or the shaft speed sensor 96 may alternatively be configured to measure respective torque and/or rotation speed parameters for the first shaft 52. The fuel flow rate sensor 98 is configured to measure a flow rate of fuel supplied to the combustor 40. The present disclosure is not limited to the particular sensors 94, 96, 98 of the one or more sensors 80 described above. For example, the one or more sensors 80 may additionally or alternatively include pressure sensors, temperature sensors, accelerometers, fluid flow sensors, and the like.

The controller 82 is connected in communication (e.g., signal communication) with at least some of the components of the propeller blade control assembly 24 to control and/or receive signals therefrom to perform the functions described herein. The controller 82 includes a processor 100 connected in signal communication with memory 102. The processor 100 may include any type of computing device, computational circuit, processor(s), CPU, computer, or the like capable of executing a series of instructions that are stored in the memory 102. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the propeller blade control assembly 24 to accomplish the same algorithmically and/or by coordination of propeller blade control assembly 24 components. The memory 102 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) maybe directly or indirectly coupled to the controller 82. The controller 82 may include, or may be in communication with, an input device that enables a user to enter data and/or instructions, and may include, or be in communication with, an output device configured, for example to display information (e.g., a visual display or a printer), or to transfer data, etc. Communications between the controller 82 and the propeller blade control assembly 24 and its components may be via a hardwire connection or via a wireless connection. A person of skill in the art will recognize that portions of the controller 82 may assume various forms (e.g., digital signal processor, analog device, etc.) capable of performing the functions described herein.

The controller 82 may form or otherwise be part of an electronic engine controller (EEC) for the propulsion system 20. The EEC may control operating parameters of the gas turbine engine 22 including, but not limited to, fuel flow, stator vane position (e.g., variable compressor inlet guide vane (IGV) position), compressor air bleed valve position, propeller 62 rotation speed, propeller blade 66 pitch, etc. so as to control an engine power and/or thrust of the gas turbine engine 22. In some embodiments, the EEC may be part of a full authority digital engine control (FADEC) system for the propulsion system 20. The controller 82 may be configured to determine or receive operational parameters of the aircraft on which the propulsion system 20 is installed such as, but not limited to, airspeed, air temperature and humidity (e.g., density), altitude, propeller speed, and precipitation conditions. The controller 82 may be configured to synthesize one or more engine operating parameters (e.g., engine or propulsion system power parameters) of the gas turbine engine 22, for example, using the output signals from the one or more sensors 80. For example, the controller 82 may be configured to synthesize an inter-turbine temperature (ITT) value, a shaft torque value (e.g., second shaft 58 torque), and/or a shaft horsepower (SHP) (e.g., second shaft 58 horsepower) for the gas turbine engine 22.

During operation of an aircraft propulsion system, such as the propulsion system 20, measured propeller blade pitch values may be used for control of a variety of different propulsion system control functions (e.g., as implemented by an EEC, FADEC, and/or another engine controller). We have found that measured propeller blade pitch values which are erroneous (e.g., not representative of actual propeller blade pitch; different than an actual propeller blade pitch by an amount exceeding an acceptable threshold) may cause or increase a likelihood of detrimental propulsion system handling characteristics (e.g., thrust, air speed, acceleration, etc.). For example, an aircraft propulsion system having a constant-speed propeller configuration may modulate propeller blade pitch to maintain a constant or substantially constant propeller rotation speed (e.g., revolutions per minute (RPM)), irrespective of the amount of engine torque being product or the airspeed or altitude for the associated aircraft. In such an example, an erroneous measured propeller blade pitch value may cause the associate propulsion system to maintain an improper propeller rotation speed and/or thrust for the propulsion system. Erroneous measured propeller blade pitch values may be caused, for example, by improper or degraded operation of a blade position sensor for the propeller blades as a result of factors such as, but not limited to, obstruction of blade position sensor movement (e.g., by a foreign object), improper conversion of propeller blade rotational motion into linear motion, or loss of sensor calibration.

Figure 4:
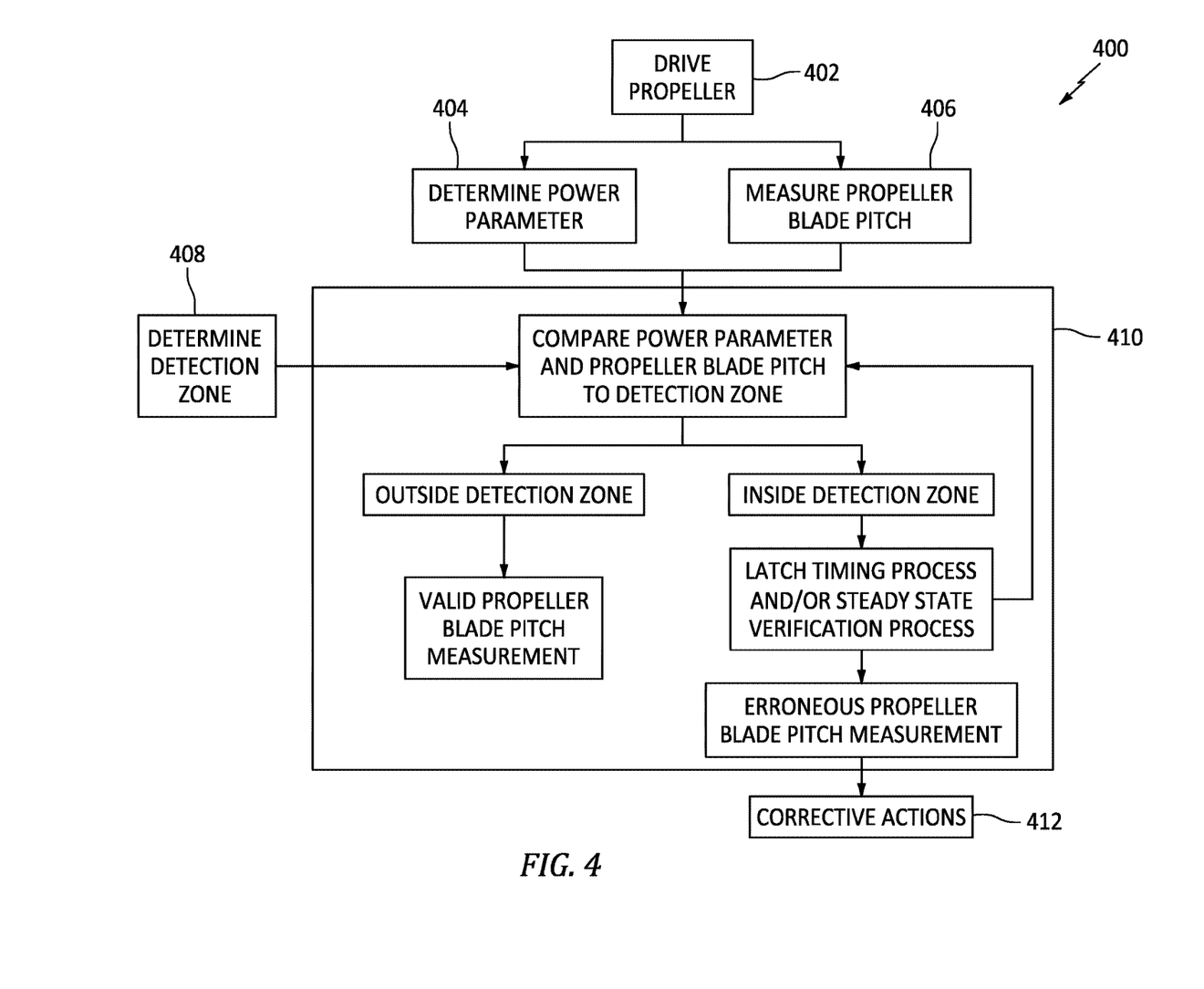
FIG. 4 illustrates a block diagram of a method for detecting an erroneous propeller blade pitch, in accordance with one or more embodiments of the present disclosure.

Referring to FIGS. 2-4, a Method 400 for detecting erroneous propeller blade pitch measurements is provided. FIG. 4 illustrates a flowchart for the Method 400. The Method 400 may be performed for the propulsion system 20 and its gas turbine engine 22, as described herein. The controller 82 may be used to execute or control one or more steps of the Method 400. For example, the processor 100 may execute instructions stored in memory 102, thereby causing the controller 82 and/or its processor 100 to execute or otherwise control one or more steps of the Method 400. However, while the Method 400 may be described herein with respect to the propulsion system 20, the gas turbine engine 22, and the controller 82, the present disclosure Method 400 is not limited to use with the propulsion system 20, the gas turbine engine 22, or the controller 82 described herein. Unless otherwise noted herein, it should be understood that the steps of Method 400 are not required to be performed in the specific sequence in which they are discussed below and, in some embodiments, the steps of Method 400 may be performed separately or simultaneously.

Step 402 may include driving (e.g., rotating) the propeller 62 to generate aircraft thrust. For example, the controller 82 may control or otherwise facilitate operation of the gas turbine engine 22 to drive the propeller 62 with the second shaft 58. The controller 82 may control a rotation speed of the propeller 62 and/or the pitch of the propeller blades 66 to generate thrust.

Step 404 includes determining one or more propulsion system operating parameters for the propulsion system 20 and/or its gas turbine engine 22. For example, Step 404 may include measuring, calculating, synthesizing, or otherwise obtaining one or propulsion system operating parameters. The propulsion system operating parameters may include propulsion system power parameters, which propulsion system power parameters may be representative of a power output of the propulsion system 20 and/or its gas turbine engine 22. For example, the propulsion system power parameters may include, but are not limited to, torque (e.g., second shaft 58 torque), shaft horsepower (SHP) (e.g., second shaft 58 horsepower), combustor fuel flow, ITT, compressor (e.g., compressor 38) discharge pressure, or overall pressure ratio (OPR) (e.g., for the compressor 38). The present disclosure, however, is not limited to the aforementioned propulsion system power parameters. The torque may be measured, for example, by the torque sensor 94. The controller 82 may calculate a torque value using the output signal from the torque sensor 94. The controller 82 may calculate the SHP, for example, using the torque value and propeller rotation speed value (e.g., measured by the rotation speed sensor 96). As previously discussed, the controller 82 may synthesize one or more of the propulsion system power parameters such as, for example, ITT for the gas turbine engine 22. The use of synthesized values for the propulsion system power parameters may facilitate improved reliability for detecting erroneous propeller blade pitch measurements as the synthesized values may continue to provide accurate representation of propulsion system power in the event of a failure of one or more sensors (e.g., the torque sensor 94).

Step 406 includes measuring the pitch for the propeller blades 66. For example, the blade position sensor 92 may measure the pitch for the propeller blades 66 and generate an output signal representative of the pitch. The controller 82 may calculate the pitch value using the output signal from the blade position sensor 92.

Figure 5:
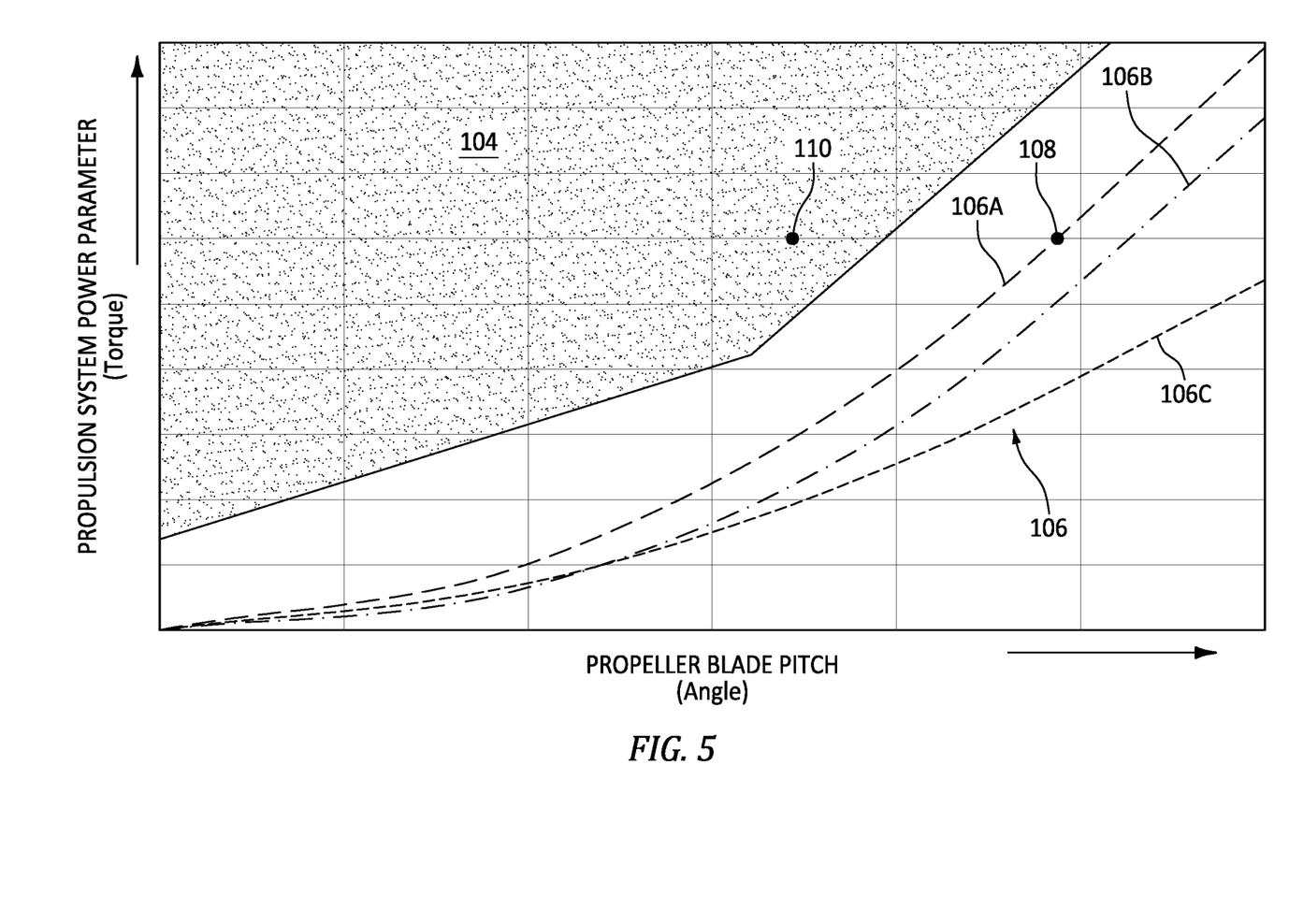
FIG. 5 illustrates a graph plotting a propulsion system power parameter versus propeller blade pitch, in accordance with one or more embodiments of the present disclosure.
Figure 6:
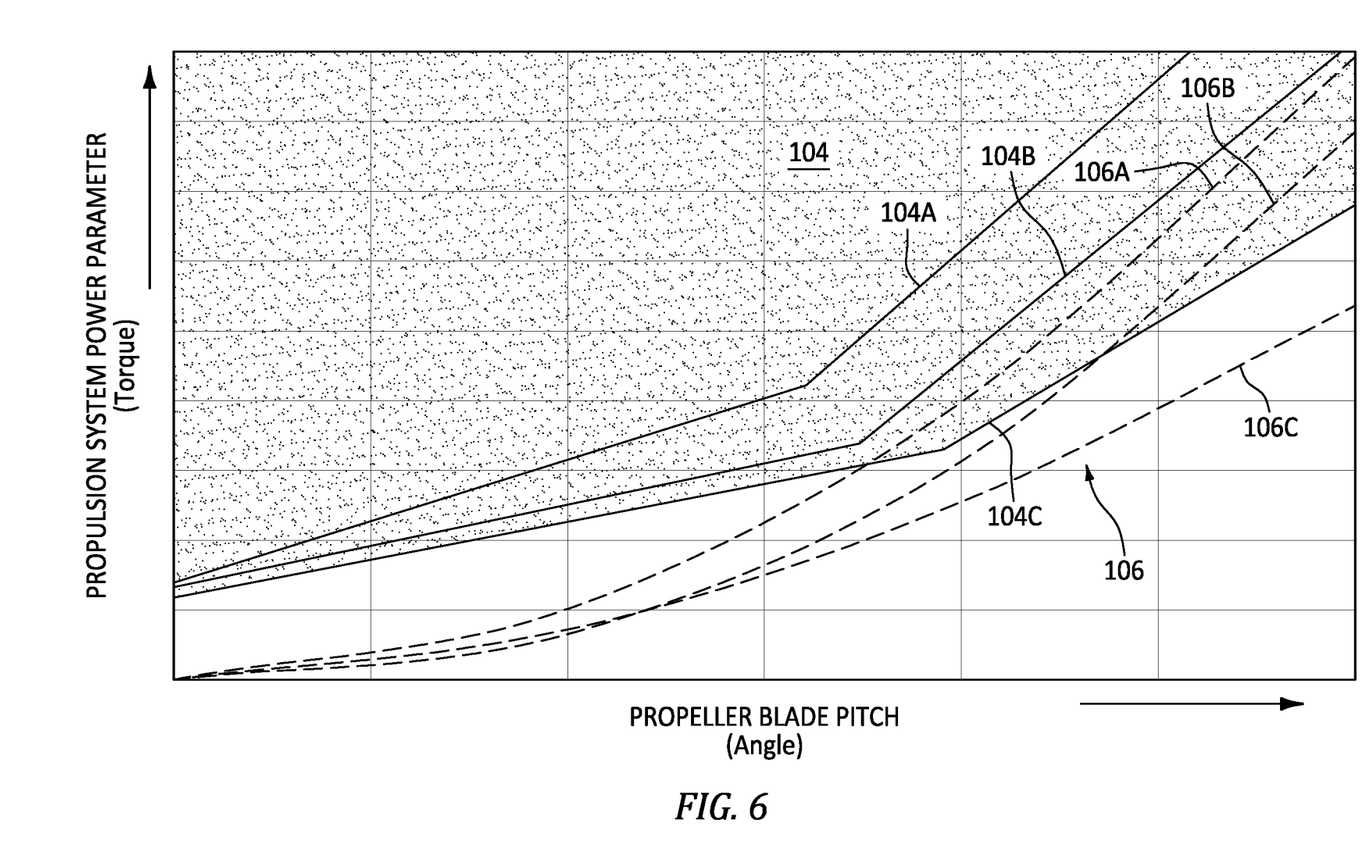
FIG. 6 illustrates another graph plotting a propulsion system power parameter versus propeller blade pitch, in accordance with one or more embodiments of the present disclosure.

Step 408 includes determining or otherwise applying a detection zone for detecting erroneous propeller blade pitch measurements. FIGS. 5 and 6 illustrate exemplary detection zones 104. The detection zone 104 is a function of a propulsion system power parameter and the pitch of the propeller blades 66. The propulsion system power parameter for FIGS. 5 and 6 is a torque parameter (e.g., torque for the second shaft 58), however, as previously discussed, the propulsion system power parameter is not limited to torque. For example, the detection zone 104 illustrated in FIGS. 5 and 6 is representative of values of the propulsion system power parameter and the propeller blade 66 pitch which may be indicative of an erroneous propeller blade pitch measurement. Alternatively, the detection zone 104 may be selected to be representative of values of the propulsion system power parameter and the propeller blade 66 pitch which may be indicative of an expected (e.g., correct) propeller blade pitch measurement. The detection zone 104 may alternatively be implemented using minimum and maximum values of the propulsion system power parameter, which minimum and maximum values may be selected for values or ranges of the propeller blade pitch.

FIGS. 5 and 6 additionally include exemplary propeller blade pitch curves 106 which are representative of expected (e.g., normal) torque values over a range of possible propeller blade 66 pitch values. Expected torque values over the range of propeller blade 66 pitch values may be affected by one or more aircraft and/or propulsion system operating conditions such as, but not limited to, airspeed, air temperature and humidity (e.g., air density), altitude, propulsion system configuration, propeller speed, precipitation, propeller forward operation or reverse operation, etc. The propeller blade pitch curves 106 of FIGS. 5 and 6 include a first pitch curve 106A, a second pitch curve 106B, and a third pitch curve 106C. Each pitch curve 106A-C is representative of expected torque values over the range of propeller blade 66 pitch values for different aircraft and/or propulsion system operating conditions.

The detection zone 104 may be defined by predetermined ranges of propulsion system power parameter values and propeller blade pitch values. The predetermined ranges of the detection zone 104 may be selected based on expected values of the propulsion system power parameter and the propeller blade pitch for one or more aircraft and/or propulsion system operating conditions (e.g., expected conditions for aircraft operation). Expected values of the propulsion system power parameter and propeller blade pitch for aircraft and/or propulsion system operating conditions may be determined by experiment, analysis, simulation, modeling, and the like. For example, the predetermined ranges of the detection zone 104 may be selected so that expected values of the propulsion system power parameter and propeller blade pitch will be outside the detection zone 104 for all or a substantial amount of the expected aircraft and/or propulsion system operating conditions. In this regard, the identification of the measured propulsion system power parameter and propeller blade pitch within the detection zone 104 may be indicative of an erroneous propeller blade pitch measurement. The predetermined ranges of the detection zone 104 may be selected to provide a suitable margin between the detection zone 104 and expected values of the propulsion system power parameter and propeller blade pitch, for example, to account for sensor measurement tolerances (e.g., instrument error) and/or to reduce a likelihood of false positives in the detection of erroneous propeller blade pitch measurements.

The detection zone 104 may alternatively be selected or determined (e.g., dynamically determined by the controller 82) based on at least one of the one or more aircraft and/or propulsion system operating conditions. For example, ranges of the propulsion system power parameter and propeller blade pitch may be selected or determined based on at least one of the one or more aircraft and/or propulsion system operating conditions. FIG. 6 illustrates exemplary detection zones 104 including a first detection zone 104A, a second detection zone 104B, and a third detection zone 104C. Each of the detections zone 104A-C is determined for different aircraft and/or propulsion system operating conditions. For example, the detection zone 104A may be selective or determined for the at least one of the one or more aircraft and/or propulsion system operating conditions corresponding to the first pitch curve 106A, the detection zone 104B may be determined for the at least one of the one or more aircraft and/or propulsion system operating conditions corresponding to the first pitch curve 106B, and the detection zone 104C may be determined for the at least one of the one or more aircraft and/or propulsion system operating conditions corresponding to the first pitch curve 106C. The controller 82 may receive aircraft and/or propulsion system operating condition measurements, data, and/or other signals from one or more other sensors and/or controllers of the propulsion system 20 and/or the aircraft on which the propulsion system 20 is installed. The controller 82 may select the detection zone 104 from a plurality of detection zones 104 (e.g., stored in the memory 102) based on the using the aircraft and/or propulsion system operating condition measurements, data, and/or other signals. For example, the controller 82 may select a detection zone 104 of the plurality of detection zones 104 having a best fit with the aircraft and/or propulsion system operating conditions. The detection zone 104 may be dynamically determined by the controller 82 using the aircraft and/or propulsion system operating condition measurements, data, and/or other signals, for example, based on parameter look-up tables (e.g., stored in the memory 102), propulsion system power parameter modeling based on the aircraft and/or propulsion system operating conditions, or another processor-executed algorithm for determining the detection zone 104. Determining the detection zone 104 based on at least one of the one or more aircraft and/or propulsion system operating conditions may increase the complexity of detecting erroneous propeller blade pitch measurements, but may also facilitate improved detection accuracy and/or sensitivity (e.g., by facilitating the use of a smaller margin between the determined detection zone 104 and the expected values of the propulsion system power parameter and the propeller blade pitch).

Step 410 includes detecting a presence or an absence of an erroneous propeller blade pitch measurement (e.g., from the blade position sensor 92). The measured values of the propulsion system power parameter and the propeller blade pitch may be compared to the detection zone 104 to identify whether the propulsion system power parameter and the propeller blade pitch (e.g., a point representing the propulsion system power parameter and the propeller blade pitch) are within the detection zone 104 or outside of the detection zone 104. For example, with reference to FIG. 5, a measured values of torque and propeller blade pitch may be compared to the detection zone 104 to determine whether the measured values of the torque and the propeller blade pitch are within the detection zone 104 or outside of the detection zone 104. FIG. 5 illustrates a first measurement point 108 and a second measurement point 110. Each of the first measurement point 108 and the second measurement point 110 represent measured values of the torque and the propeller blade pitch. The first measurement point 108 is outside of the detection zone 104. Accordingly, the controller 82 may identify the measurement of the propeller blade pitch for the first measurement point 108 as a valid propeller blade pitch measurement. In other words, the controller 82 may identify an absence of an erroneous propeller blade pitch measurement. The second measurement point 110 is within the detection zone 104. Accordingly, the controller 82 may identify the measurement of the propeller blade pitch for the second measurement point 110 as an erroneous propeller blade pitch measurement. The values of the propulsion system power parameter and the propeller blade pitch may be continuously measured during operation of the propulsion system 20 and/or its propeller 62 and compared to the detection zone 104 to identify a presence or an absence of an erroneous propeller blade pitch measurements.

Step 410 may include execution of a latch timing process and/or a steady state verification process prior to detecting the presence of an erroneous propeller blade pitch measurement. Identification of measured values of the propulsion system power parameter and the propeller blade pitch within the detection zone 104 may cause the controller 82 to initiate a latch timing process. For example, the latch timing process may cause the controller 82 to detect the presence of an erroneous propeller blade pitch measurement only if the controller 82 receives multiple measured values (e.g., multiple consecutive measured values) of the propulsion system power parameter and the propeller blade pitch within the detection zone 104. Identification of measured values of the propulsion system power parameter and the propeller blade pitch within the detection zone 104 may additionally or alternatively cause the controller 82 to initiate a steady state verification process. For example, the steady state verification process may cause the controller 82 to detect the presence of an erroneous propeller blade pitch measurement only if the controller 82 identifies a steady-state condition of the measured propulsion system power parameter (e.g., the propulsion system power parameter does not change by more than X percent (or X units) over a period of Y time). Application of the latch timing process and/or the steady state verification process prior to detecting the presence of an erroneous propeller blade pitch measurement may prevent or facilitate a reduced likelihood of false positives in the detection of erroneous propeller blade pitch measurements, for example, during propulsion system 20 transient operations (e.g., acceleration).

Step 412 may include execution of one or more corrective actions in response to detecting the presence of an erroneous propeller blade pitch measurement. For example, Step 412 may include generating (e.g., with the controller 82) a warning (e.g., an audible alarm, a warning light, a warning message, etc.) for a pilot or other operator of an aircraft on which the propulsion system 20 is installed. The warning may inform the pilot or other operator that propeller blade pitch measurements, and any other parameter which may be derived or controlled therefrom, may be erroneous. The warning may inform the pilot or other operator to take one or more actions (e.g., adjusting or cycling propeller blade pitch positions to see if valid propeller blade pitch measurement is restored). Step 412 may additionally or alternatively include generating and/or substituting another parameter for the erroneous measured values of the propeller blade pitch. For example, the controller 82 may use and/or provide a substitute propeller blade pitch value to one or more other controllers, computer systems, or the like which may use the propeller blade pitch value for one or more control functions. The substitute propeller blade pitch value may be a default (e.g., predetermined) propeller blade pitch value selected based on the measured value of the propulsion system power parameter. Alternatively, the substitute propeller blade pitch value may be a synthesized value which may be estimated based on one or more other propulsion system operating parameters (e.g., torque, SHP, fuel flow, ITT, etc.). For example, the substitute propeller blade pitch value may be a target pitch curve (e.g., a minimum and maximum propeller blade pitch limit curve) stored in the memory 102. In some embodiments, Step 412 may include calculating a new target pitch curve based on a predetermined targe pitch curve stored in the memory 102. For example, the controller 82 may offset the predetermined target pitch curve by a conservative angle value which offsets the new target pitch curve farther from a reverse pitch position for the propeller blades 66 (e.g., a pitch of the propeller blades 66 in which the propeller blades 66 will generate reverse thrust) because the measured pitch of the propeller blades 66 from the blade position sensor 92 can no longer be used to ensure that the propeller blades 66 do not have a reverse pitch.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft propulsion system, the assembly comprising:
   a propeller configured for rotation about a rotational axis, the propeller including a plurality of propeller blades circumferentially distributed about the propeller, the plurality of propeller blades having a pitch, each propeller blade of the plurality of propeller blades configured for rotation about a respective lengthwise axis to selectively vary the pitch;
   a blade position sensor configured to measure the pitch, the blade position sensor configured to generate a pitch output signal representative of the measured pitch; and
   a controller in signal communication with the blade position sensor, the controller including a processor in communication with a non-transitory memory storing instructions, which instructions when executed by the processor, cause the processor to:
       detect a presence or an absence of an erroneous propeller blade pitch measurement using at least the pitch output signal and a propulsion system power parameter of the aircraft propulsion system.

2. The assembly of claim 1, further comprising:
   a rotatable shaft connected to the propeller, the rotatable shaft configured to drive the propeller for rotation about the rotational axis; and
   a torque sensor disposed at the rotatable shaft, the torque sensor configured to measure a torque of the shaft and generate a torque output signal representative of the measured torque;
   wherein the torque output signal is the propulsion system power parameter.

3. The assembly of claim 1, wherein the instructions, when executed by the processor, further cause the processor to identify the presence or the absence of the erroneous propeller blade pitch measurement by comparing the pitch output signal and the propulsion system power parameter to a detection zone.

4. The assembly of claim 3, wherein the instructions, when executed by the processor, further cause the processor to identify the presence of the erroneous propeller blade pitch measurement based on identification of the pitch output signal and the propulsion system power parameter within the detection zone.

5. The assembly of claim 3, wherein the instructions, when executed by the processor, further cause the processor to determine the detection zone based on one or more aircraft operating conditions.

6. The assembly of claim 5, wherein the one or more aircraft operating conditions includes at least one of airspeed, air temperature, humidity, and altitude.

7. The assembly of claim 1, wherein the instructions, when executed by the processor, further cause the processor to identify the presence of the erroneous propeller blade pitch measurement subsequent to execution of a latch timing process by the processor.

8. The assembly of claim 1, wherein the instructions, when executed by the processor, further cause the processor to identify the presence of the erroneous propeller blade pitch measurement subsequent to execution of a steady state verification process by the processor.

9. The assembly of claim 1, wherein the instructions, when executed by the processor, further cause the processor to generate a warning in response to detecting the presence of the erroneous propeller blade pitch measurement.

10. The assembly of claim 1, wherein the instructions, when executed by the processor, further cause the processor to generate a substitute value of the pitch in response to detecting the presence of the erroneous propeller blade pitch measurement.

11. A method for detecting an erroneous propeller blade pitch measurement for an aircraft propulsion system, the method comprising:
    determining a propulsion system power parameter;
    measuring a propeller blade pitch for a plurality of propeller blades of a propeller for the aircraft propulsion system;
    comparing the propulsion system power parameter and the propeller blade pitch to a detection zone; and
    detecting an erroneous propeller blade pitch measurement based on identification of the propulsion system power parameter and the propeller blade pitch within the detection zone.

12. The method of claim 11, wherein the detection zone is defined by predetermined ranges of the propulsion system power parameter and the propeller blade pitch.

13. The method of claim 11, further comprising selecting the detection zone based on one or more aircraft operating conditions.

14. The method of claim 11, further comprising determining the detection zone based on one or more aircraft operating conditions.

15. The method of claim 11, further comprising identifying the propulsion system power parameter and the propeller blade pitch within the detection zone and executing one or both of a latch timing process and a steady state verification process prior to detecting the erroneous propeller blade pitch measurement based on identification of the propulsion system power parameter and the propeller blade pitch within the detection zone.

16. An aircraft propulsion system comprising:
    a rotatable shaft configured for rotation about a rotational axis;
    a propeller connected to the rotatable shaft, the propeller configured to be driven by the rotatable shaft for rotation about the rotational axis, the propeller including a plurality of propeller blades having a pitch;
    a torque sensor configured to measure a torque of the rotatable shaft;
    a blade position sensor configured to measure the pitch; and
    a controller in signal communication with the torque sensor and the blade position sensor, the controller including a processor in communication with a non-transitory memory storing instructions, which instructions when executed by the processor, cause the processor to:
        detect a presence or an absence of an erroneous propeller blade pitch measurement using the torque and the pitch.

17. The aircraft propulsion system of claim 16, wherein the instructions, when executed by the processor, further cause the processor to identify the presence or the absence of the erroneous propeller blade pitch measurement by comparing the pitch and the torque to a detection zone.

18. The aircraft propulsion system of claim 17, wherein the instructions, when executed by the processor, further cause the processor to identify the presence of the erroneous propeller blade pitch measurement based on identification of the pitch and the torque within the detection zone.

19. The aircraft propulsion system of claim 17, wherein the instructions, when executed by the processor, further cause the processor to determine the detection zone based on one or more aircraft operating conditions.

* * * * *